US012346997B2

United States Patent
Ye et al.

(10) Patent No.: US 12,346,997 B2
(45) Date of Patent: Jul. 1, 2025

(54) METHOD AND APPARATUS FOR LOW-DOSE X-RAY COMPUTED TOMOGRAPHY IMAGE PROCESSING BASED ON EFFICIENT UNSUPERVISED LEARNING USING INVERTIBLE NEURAL NETWORK

(71) Applicant: Korea Advanced Institute of Science and Technology, Daejeon (KR)

(72) Inventors: Jongchul Ye, Daejeon (KR); Taesung Kwon, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 332 days.

(21) Appl. No.: 17/848,689

(22) Filed: Jun. 24, 2022

(65) Prior Publication Data

US 2022/0414954 A1 Dec. 29, 2022

(30) Foreign Application Priority Data

Jun. 28, 2021 (KR) .................. 10-2021-0084256
Oct. 1, 2021 (KR) .................. 10-2021-0130686

(51) Int. Cl.
*G06T 11/00* (2006.01)
*G06T 5/70* (2024.01)

(52) U.S. Cl.
CPC .............. *G06T 11/006* (2013.01); *G06T 5/70* (2024.01); *G06T 2207/10081* (2013.01); *G06T 2207/20081* (2013.01); *G06T 2207/20084* (2013.01); *G06T 2207/30168* (2013.01)

(58) Field of Classification Search
CPC ....... G06T 11/006; G06T 11/008; G06T 5/70; G06T 5/60; G06T 2207/10081; G06T 2207/20081; G06T 2207/20084; G06T 2207/30168; G06T 2211/441; G06T 2211/444

See application file for complete search history.

(56) References Cited

U.S. PATENT DOCUMENTS

2019/0371018 A1* 12/2019 Ye ..................... G06T 11/006

OTHER PUBLICATIONS

Kuanar et al, Low Dose Abdominal CT Image Reconstruction: An Unsupervised Learning Based Approach, 2019, IEEE International Conference on Image Processing, pp. 1-5. (Year: 2019).*
Zhu et al, Unpaired Image-to-Image Translation using Cycle-Consistent Adversarial Networks, 2020, arXiv: 1703.10593v7, pp. 1-18. (Year: 2020).*

(Continued)

*Primary Examiner* — Kathleen M Broughton
(74) *Attorney, Agent, or Firm* — ArentFox Schiff LLP; Joseph M. Maraia

(57) ABSTRACT

Disclosed are a method and apparatus for processing a low-dose X-ray computed tomography image based on efficient unsupervised learning by using an invertible neural network. The method of processing a low-dose X-ray computed tomography image based on unsupervised learning by using an invertible neural network performed by a computer device includes providing an invertible generator for restoring an image, and training the invertible generator to restore a low-dose computed tomography image to a normal computed tomography image.

20 Claims, 18 Drawing Sheets

(56) References Cited

OTHER PUBLICATIONS

Kingma et al, Glow: Generative Flow with Invertible 1x1 Convolutions, 2018, arXiv: 1807.03039v2, pp. 1-15. (Year: 2018).*
Gu et al, AdaIN-Based Tunable CycleGAN for Efficient Unsupervised Low-Dose CT Denoising, 2021, IEEE Transactions on Computational Imaging, pp. 1-14. (Year: 2021).*
Ma et al, Low-Dose CT Image Denoising Using a GAN with a Hybrid Loss Function for Noise Learning, 2020, IEEE Digital Object Identifier, 8 (2020) pp. 1-11. (Year: 2020).*
Van der Ouderaa et al, Reversible GANS for Memory-Efficient Image-To-Image Translation, 2019, IEEE/CVF Conference on Computer Vision and Pattern Recognition, pp. 1-10. (Year: 2019).*
Kwon et al., "Cycle-free CycleGAN using Invertible Generator for Unsupervised Low-Dose CT Denoising," Electrical Engineering and Systems Science; Image and Video Processing; arXiv:2104.08538 (eess); [Submitted on Apr. 17, 2021].
Gu et al., "AdaIN-Based Tunable CycleGAN for Efficient Unsupervised Low-Dose CT Denoising," IEEE Transactions on Computational Imaging; vol. 7; 2021.
Dinh et al., "Nice: Non-Linear Independent Components Estimation," Accepted as a workshop contribution at ICLR 2015; Departement' d'informatique et de recherche operationnelle; Universite' de Montreal; arXiv:1410.8516v6 [cs.LG]; Apr. 10, 2015.
Su et al., "f-VAEs: Improve VAEs with Conditional Flows," School of Mathematics, Sun Yat-sen University; School of Hefei University of Technology; https://doi.org/10.48550/arXiv.1809.05861; (Submitted on Sep. 16, 2018).
Cha et al., "Unpaired Training of Deep Learning tMRA for Flexible Spatio-Temporal Resolution," IEEE Transactions on Medical Imaging; vol. 40, No. 1; Jan. 2021.
Kingma et al., "Glow: Generative Flow with Invertible 1×1 Convolutions," 32nd Conference on Neural Information Processing Systems (NeurIPS 2018), Montreal, Canada.
Yan et al., "Cycle-Consistent Generative Adversarial Network: Effect on Radiation Dose Reduction and Image Quality Improvement in Ultralow-Dose CT for Evaluation of Pulmonary Tuberculosis," Korean Journal of Radiology, vol. 22(6), pp. 983-993 (2021), 11 pages.

* cited by examiner

METHOD AND APPARATUS FOR LOW-DOSE X-RAY COMPUTED TOMOGRAPHY IMAGE PROCESSING BASED ON EFFICIENT UNSUPERVISED LEARNING USING INVERTIBLE NEURAL NETWORK

CROSS-REFERENCE TO RELATED APPLICATIONS

A claim for priority under 35 U.S.C. § 119 is made to Korean Patent Application No. 10-2021-0084256 filed on Jun. 28, 2021 and Korean Patent Application No. 10-2021-0130686 filed on Oct. 1, 2021, in the Korean Intellectual Property Office, the entire contents of which are hereby incorporated by reference.

BACKGROUND

Embodiments of the inventive concept described herein relate to neural network-based low-dose X-ray computed tomography image restoration technology, and more particularly, relate to a method and apparatus for processing a low-dose X-ray computed tomography image based on efficient unsupervised learning by using an invertible neural network.

X-ray computed tomography (CT) is one of the most commonly used medical imaging schemes because of the advantages of high-resolution imaging within a short scan time. However, because excessive X-ray radiation may potentially increase the incidence of cancer, low-dose CT scans have been extensively studied to minimize radiation dose to patients. Unfortunately, various artifacts appear in the low-dose CT images, so that the diagnostic values may be greatly reduced.

Recently, a deep learning approach for low-dose CT noise removal with improved performance has been proposed. Most of these tasks are based on supervised learning, where a neural network learns paired low-dose CT (LDCT) and standard-dose CT (SDCT) images. However, it is occasionally difficult to simultaneously acquire the low-dose and high-dose images because radiation exposure to a subject is increased.

Therefore, unsupervised learning approaches that do not require matched LDCT and SDCT images have become one major research of the CT community. In particular, there has been proposed a cycle-consistency generative adversarial network (CycleGAN) approach for removing low-dose CT noise that trains networks with unpaired LDCT and SDCT images. To enable such non-pair learning, there are required two generators: one for forward mapping from LDCT to SDCT and one for backward mapping from SDCT to LDCT. Then, cycle coherence is applied such that the image that has undergone successive forward and backward mapping applications returns to the original image. Actually, recent theoretical studies show that the CycleGAN architecture appears as a double formulation of the optimal transmission problem in which the statistical distances of empirical and transmitted measurements in both the source and target domains are simultaneously minimized.

Two generators are required for learning, but only the forward generator is used for inference. Nevertheless, the CycleGAN architecture is inefficient because the reverse mapping generator requires learnable parameters and memory similar to the forward mapping. Furthermore, it is necessary to learn two generators and two discriminators at the same time for fusion, which requires high-level learning skills and know-how.

In order to alleviate this problem, Gu et al. (Non-Patent Document 1) proposed a switchable CycleGAN through adaptive instance normalization (AdaIN). The main idea is that a single generator can be switched into a forward or reverse generator by simply changing the AdaIN code generated by the lightweight AdaIN code generator. However, the switchable CycleGAN architecture still needs two discriminators to distinguish fake and real samples for the LDCT and SDCT domains, and the individual complexity is still as high as the generator.

RELATED ART LITERATURE

Non-Patent Literature (Non-Patent Document 1) J. Gu and J. C. Ye, "AdaIN-based tunable CycleGAN for efficient unsupervised low-dose CT denoising," IEEE Transactions on Computational Imaging, vol. 7, pp. 73-85, 2021.

(Non-Patent Document 2) L. Dinh, D. Krueger, and Y. Bengio, "NICE: Non-linear independent components estimation," arXiv preprint arXiv:1410.8516, 2014.

(Non-Patent Document 3) J. Su and G. Wu, "f-VAEs: Improve VAEs with conditional flows," arXiv preprint arXiv:1809.05861, 2018.

(Non-Patent Document 4) E. Cha, H. Chung, E. Y. Kim, and J. C. Ye, "Unpaired training of deep learning tMRA for flexible spatio-temporal resolution," IEEE Transactions on Medical Imaging, vol. 40, no. 1, pp. 166-179, 2021.

(Non-Patent Document 5) D. P. Kingma and P. Dhariwal, "Glow: Generative flow with invertible lxi convolutions," in NeurIPS, 2018.

SUMMARY

Embodiments of the inventive concept provide a method and apparatus for processing a low-dose X-ray computed tomography image based on efficient unsupervised learning by using an invertible neural network. More specifically, embodiments of the inventive concept provide a technology that provides an invertible generator for restoring an image from an image, and applies the invertible generator to a cycle-consistency generative adversarial network (CycleGAN) to omit the process of reverting from a normal computed tomography image to a low-dose computed tomography image.

Embodiments of the inventive concept provide a method and apparatus for processing a low-dose X-ray computed tomography image based on efficient unsupervised learning by using an invertible neural network, which can provide an invertible generator and apply the invertible generator to CycleGAN to learn even with unmatched data and to perform unsupervised learning with only two neural networks, thereby effectively improving the image quality of a low-dose computed tomography reconstructed image and using the number of learnable parameters by $\frac{1}{10}$ (one tenth) than that of the related art.

According to an exemplary embodiment, a method of processing a low-dose X-ray computed tomography image based on unsupervised learning by using an invertible neural network performed by a computer device includes providing an invertible generator for restoring an image, and training the invertible generator to restore a low-dose computed tomography image to a normal computed tomography image.

The method may further include improving a quality of the low-dose X-ray computed tomography image based on the unsupervised learning by using a single generator neural network and a single separator neural network by providing the invertible generator.

The providing of the invertible generator may include providing an invertible block including a coupling layer.

The method may further include allowing the invertible generator to learn a distribution of an image in an invertible operation through the coupling layer.

The providing of the invertible generator may include performing a squeeze operation and an unsqueeze operation on an input image; and performing an invertible operation through an invertible block between the squeeze operation and the unsqueeze operation.

The invertible block may include a coupling layer coupled to an invertible 1×1 convolution stably and additionally.

The training of the invertible generator may include simultaneously performing, by reverse of the invertible generator, a function of reversely returning the normal computed tomography image to the low-dose computed tomography image when the invertible generator is trained to restore the low-dose computed tomography image to the normal computed tomography image.

The training of the invertible generator may include allowing the invertible generator to learn using a wavelet residual image and obtain a final image by excluding a noise pattern after obtaining the noise pattern.

According to an exemplary embodiment, an apparatus for processing a low-dose X-ray computed tomography image based on unsupervised learning by using an invertible neural network includes an invertible generator providing unit configured to provide an invertible generator for restoring an image, and a learning device configured to train the invertible generator to restore from a low-dose computed tomography image to a normal computed tomography image.

A quality of the low-dose X-ray computed tomography image based on the unsupervised learning may be improved by using a single generator neural network and a single separator neural network by providing the invertible generator.

The invertible generator providing unit may provide an invertible block including a coupling layer.

The invertible generator may learn a distribution of an image in an invertible operation through the coupling layer.

The invertible generator providing unit may perform a squeeze operation and an unsqueeze operation on an input image; and performs an invertible operation through an invertible block between the squeeze operation and the unsqueeze operation.

The invertible block may include a coupling layer capable of being coupled to an invertible 1×1 convolution stably and additionally.

The learning device may simultaneously performs a function of reversely returning the normal computed tomography image to the low-dose computed tomography image by reverse of the invertible generator when the invertible generator is trained to restore the low-dose computed tomography image to the normal computed tomography image.

The learning device may allow the invertible generator to learn using a wavelet residual image and obtain a final image by excluding a noise pattern after obtaining the noise pattern.

According to an exemplary embodiment, an invertible neural network that is used in an apparatus for processing a low-dose X-ray computed tomography image based on unsupervised learning includes an invertible block including a coupling layer for restoring an image, wherein the invertible neural network performs a squeeze operation and an unsqueeze operation on an input image and performs an invertible operation through an invertible block between the squeeze operation and the unsqueeze operation.

The invertible block may include the coupling layer capable of being coupled to an invertible 1×1 convolution stably and additionally.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
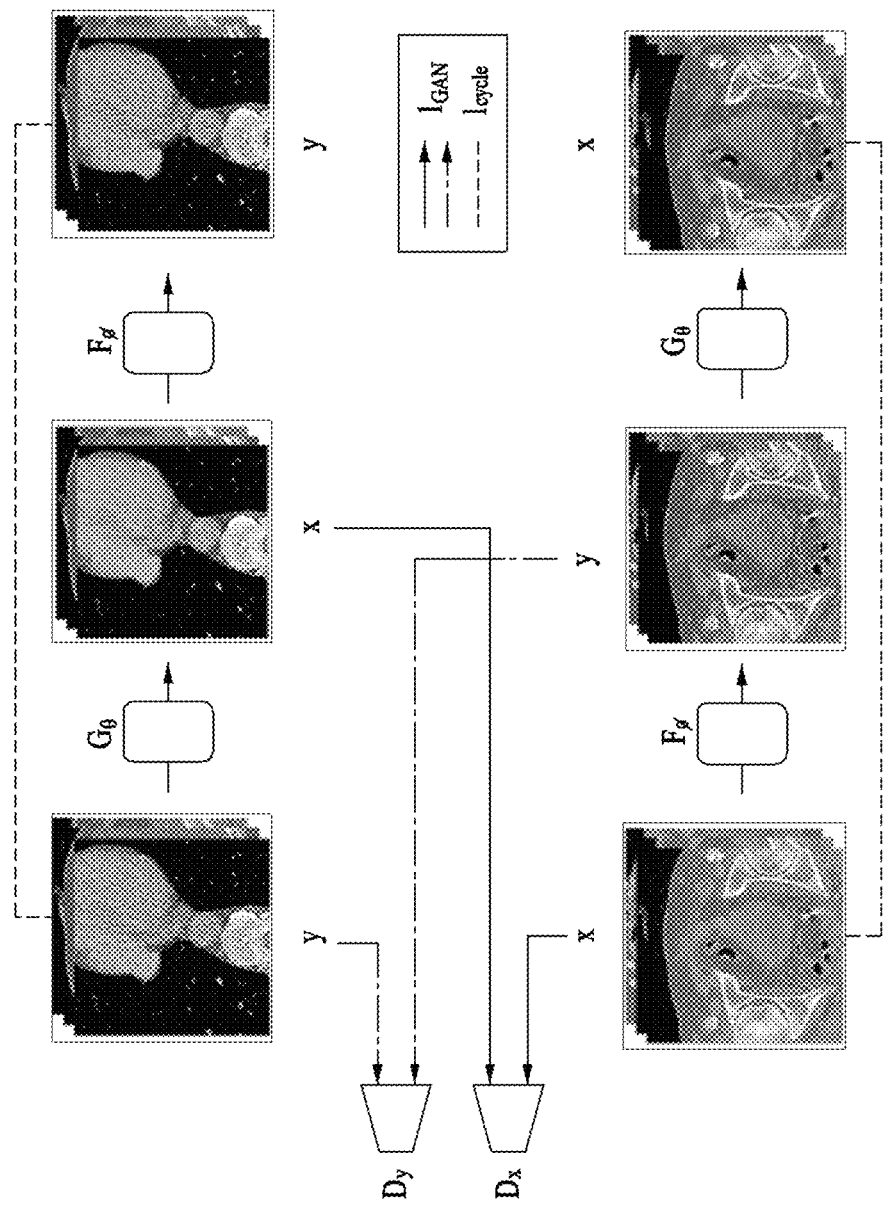
FIG. 1 is a view illustrating a general CycleGAN-based low-dose computed tomography image restoration technology.

The present invention will be described in detail below with reference to the accompanying drawings. Repeated descriptions and descriptions of known functions and configurations that have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Low-dose computed tomography (X-ray CT) may reduce the risk of cancer in patients by reducing the radiation dose of conventional X-ray computed tomography. However, in the low-dose computed tomography image, some information is lost or signal noise is included so that the image quality is very deteriorated.

Recently, CycleGAN has been shown to provide high-performance, ultra-fast noise removal for low-dose X-ray computed tomography (CT) without a paired training dataset. The CycleGAN is possible because cycle coherence is guaranteed, but the CycleGAN requires two generators and two discriminators to apply cycle coherence while requiring significant GPU resources and finesse for learning. A recent proposal of a switchable CycleGAN with adaptive instance normalization (AdaIN) partially alleviates the problem by using a single generator. However, two discriminators and an additional AdaIN code generator for learning are still required. In order to solve such a problem, the present embodiment proposes a new cycle-free CycleGAN architecture that includes a single generator and a discriminator but still guarantees cycle consistency.

The cycle-free CycleGAN comes from the observation that the cycle consistency condition is automatically met and an additional discriminator is removed from the CycleGAN formula when the invertible generator is used. In order to increase the efficiency of the invertible generator, the network is implemented in the wavelet residual domain. According to embodiments, it may be understood that the cycle-free CycleGAN can significantly improve the noise removal performance by using only 10% of the learnable parameters compared to a conventional CycleGAN through extensive experiments using low-dose CT images of various levels.

The existing low-dose X-ray computed tomography image processing method is based on unsupervised learning that requires a supervised learning-based neural network that requires matched data or four or more neural networks that can be learned even with unmatched data. Meanwhile, the low-dose X-ray computed tomography image processing method according to an embodiment is a technique capable of learning with unmatched data by developing an invertible generator and applying the invertible generator to the CycleGAN, and unsupervised-learning with only two neural networks. The cycle-free CycleGAN will be described in more detail below.

FIG. 1 is a view illustrating a general CycleGAN-based low-dose computed tomography image restoration technology.

Referring to FIG. 1, the CycleGAN has an inefficient structure that uses a total of four neural networks of a generator neural network and a discriminator neural network that restore a normal computed tomography image from a low-dose computed tomography image, and a generator neural network and a discriminator neural network that restore the low-dose computed tomography image again from the normal computed tomography image.

One of the final goals of CycleGAN research for low-dose CT noise removal is to remove unnecessary generators and delimiters while maintaining the optimality of CycleGAN in terms of optimal transmission. Indeed, one of the most important contributions of the present invention is to show that the use of an invertible generator architecture allows to completely eliminate one of the delimiters, automatically meeting cycle consistency without affecting the CycleGAN framework. That is, in this embodiment, an invertible generator that restores an image from an image is provided and applied to CycleGAN, a technique capable of omitting the process of returning from a normal computed tomography image to a low-dose computed tomography image is proposed. Meanwhile, the term 'image' used below may be used as an image including an image.

Figure 2:
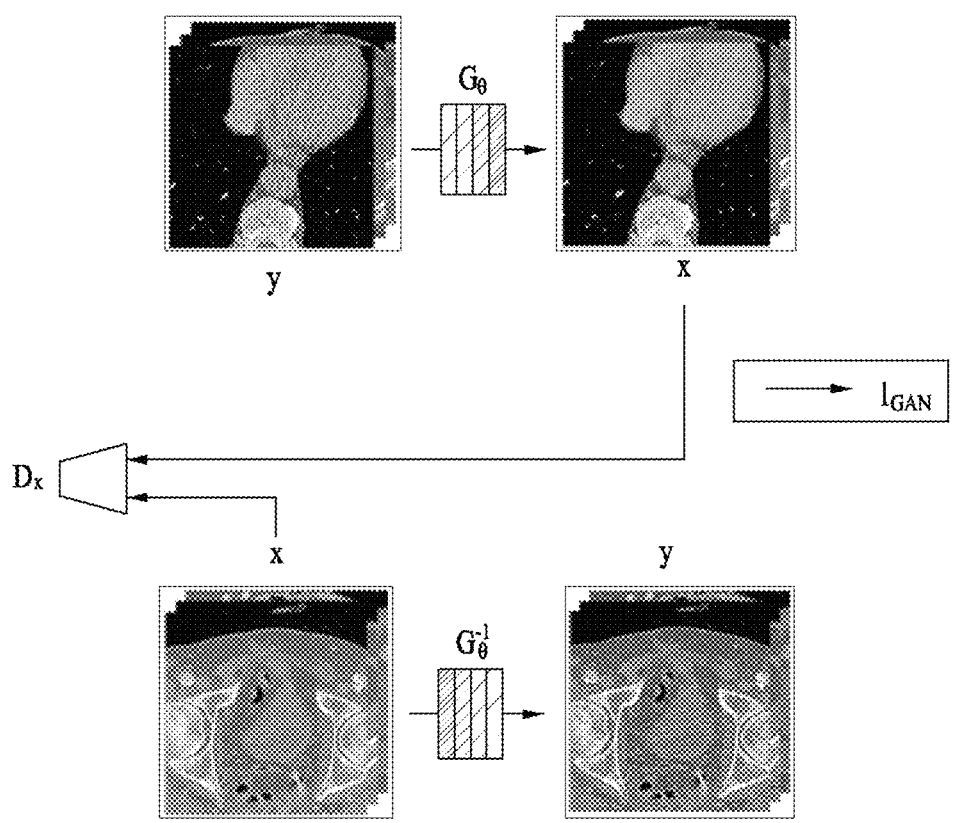
FIG. 2 is a diagram illustrating a learning process of CycleGAN learning technology using an invertible generator according to an embodiment.

FIG. 2 is a diagram illustrating a learning process of CycleGAN learning technology using an invertible generator according to an embodiment.

Referring to FIG. 2, when the invertible generator is trained to restore from a low-dose computed tomography image to a normal computed tomography image, the reverse of the invertible generator may perform a function of returning the normal computed tomography image to the low-dose computed tomography image. This may also be understood in an optimal transport-based interpretation.

To satisfy the reversibility condition, a generator according to an embodiment may be implemented using an originally proposed coupling layer for a normalization flow. Then, the generator according to an embodiment is trained with a single discriminator for distinguishing the fake SDCT from the real SDCT image. The invertible generator may learn a network by using a wavelet residual domain so that the invertible generator is sufficiently implemented for low-dose CT noise removal. Despite the absence of explicit cycle consistency, the algorithm according to an embodiment maintains the optimality of CycleGAN and provides cutting-edge noise removal technology with only 10% of the learnable parameters compared to existing CycleGAN. Because there is no explicit cycle consistency, the method according to the present embodiment will be referred to herein as cycle-free CycleGAN.

Figure 3:
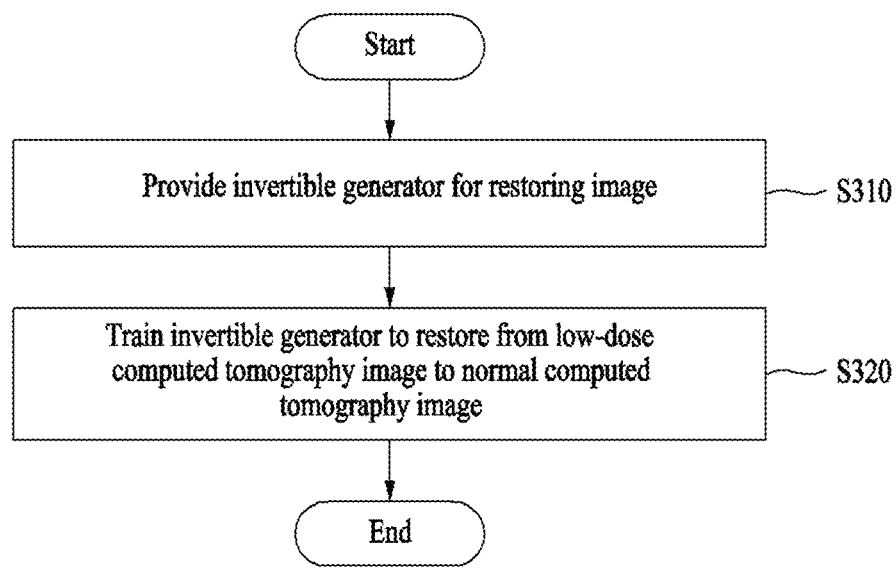
FIG. 3 is a flowchart illustrating an unsupervised learning-based low-dose X-ray computed tomography image processing method using an invertible neural network according to an embodiment.

FIG. 3 is a flowchart illustrating an unsupervised learning-based low-dose X-ray computed tomography image processing method using an invertible neural network according to an embodiment.

Referring to FIG. 3, an unsupervised learning-based low-dose X-ray computed tomography image processing method using an invertible neural network performed by a computer device according to an embodiment may include operation S310 of providing an invertible generator for restoring an image, and operation S320 of training the invertible generator to restore from a low-dose computed tomography image to a normal computed tomography image.

As described above, according to embodiments, an invertible generator may be provided such that it is possible to improve the quality of an unsupervised learning-based low-dose X-ray computed tomography image by using a single generator neural network and a single discriminator neural network.

According to embodiments, by using a scheme of omitting an unnecessary process in unsupervised learning by using an invertible neural network to improve the quality of low-dose X-ray computed tomography images, it is possible to reduce the computational complexity to 1/10 compared to the image quality improvement technique of actual existing unsupervised learning-based low-dose X-ray computed tomography (CT) images.

An unsupervised learning-based low-dose X-ray computed tomography image processing method using an invertible neural network according to an embodiment may be described using an unsupervised learning-based low-dose X-ray computed tomography image processing apparatus using an invertible neural network according to an embodiment as an example.

Figure 4:
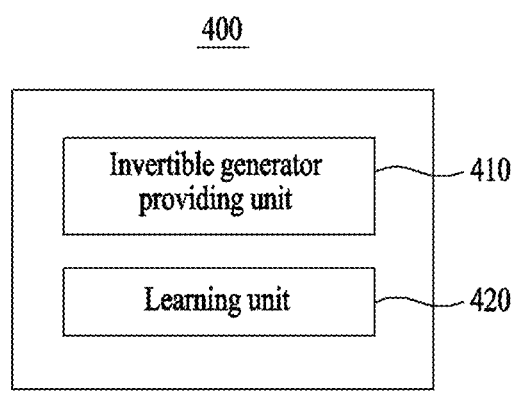
FIG. 4 is a block diagram illustrating an unsupervised learning-based low-dose X-ray computed tomography image processing apparatus using an invertible neural network according to an embodiment.

FIG. 4 is a block diagram illustrating an unsupervised learning-based low-dose X-ray computed tomography image processing apparatus using an invertible neural network according to an embodiment.

Referring to FIG. 4, an unsupervised learning-based low-dose X-ray computed tomography image processing apparatus 400 using an invertible neural network according to an embodiment may include an invertible generator providing unit 410 and a learning unit 420.

In operation S310, the invertible generator providing unit 410 may provide an invertible generator for restoring an image. As the embodiments provide an invertible generator, the quality of an unsupervised learning-based low-dose X-ray computed tomography image may be improved by using a single generator neural network and a single discriminator neural network.

The invertible generator providing unit 410 may provide an invertible block including a coupling layer. In this case, through the coupling layer, the invertible generator may learn the image distribution in the invertible operation.

In particular, the invertible generator providing unit 410 may perform a squeeze operation and an unsqueeze operation on an input image, and perform an invertible operation through an invertible block between the squeeze operation and the unsqueeze operation. In this case, the invertible block may include a coupling layer capable of being further combined stably with an invertible 1×1 convolution.

In operation S320, the learning unit 420 may train the invertible generator to restore from the low-dose computed tomography image to the normal computed tomography image. In this case, when the learning unit 420 trains the invertible generator to restore from the low-dose computed tomography image to the normal computed tomography image, at the same time, the inverse of the invertible generator may perform a function of returning the normal computed tomography image to the low-dose computed tomography image again.

The learning unit 420 may obtain a final image by excluding a noise pattern after the invertible generator learns by using the wavelet residual image and obtains the noise pattern.

As described above, according to embodiments, there may be provided a technique capable of omitting an operation (two neural networks) of providing an invertible generator neural network that restores an image from an image and returning a normal computed tomography image to a low-dose computed tomography image by applying it to CycleGAN. According to embodiments, it is possible to effectively improve the quality of the restored low-dose computed tomography image, and to reduce the number of learnable parameters required for learning to 1/10 (one tenth) than that of the related art.

Hereinafter, an unsupervised learning-based low-dose X-ray computed tomography image processing method and apparatus using an invertible neural network according to embodiments will be described in more detail.

Normalizing Flow

Inspired by a normalizing flow (NF) or an invertible flow, a method according to an embodiment is briefly reviewed to highlight similarities with and differences from embodiments. Because it is difficult to describe the relationship between the initial derivation of the normalizing flow (Non-Patent Document 2) and cycle-free CycleGAN, the present disclosure proposes a new derivation inspired by f-VAE (Non-Patent Document 3).

First, it is assumed that X and Z represent a surrounding space and a latent space, respectively. In classical variation inference, model distribution $p\theta(x) \in X$ may be obtained by combining latent spatial distribution $p(z)$, $z \in Z$ with a series of conditional distributions $p\theta(x|z)$, which may lead to an interesting lower bound and may be expressed as following Equation 1 and Equation 2.

[Equation 1]

$$\log p_\theta(x) = \log(\int p_\theta(x|z)p(z)dz) \geq -l_{ELBO}(x;\theta,\phi)$$

[Equation 2]

$$:= -\int \log p_\theta(x|z)q_\phi(z|x)dz + D_{KL}(q_\phi(z|x)\|p(z))$$

Wherein $D_{KL}(q\|\mathbb{P})$ denotes the Kullback-Leibler (KL) divergence. The lower bound of Equation 1 is called an evidence lower bound (ELBO) or a variation lower bound. Then, the goal of the variance inference is to find $\theta$ and posterior $q_\phi(z|x)$ which maximize the lower bound or minimize the lower bound of ELBO.

Among the various selections of the posterior $q_\phi(z|x)$ for ELBO, the posterior is the most frequently used and expressed as following Equation 3 (Non-Patent Document 3).

[Equation 3]

$$q_\phi(z|x) = \int \delta(z - F_\phi^u(x))r(u)du \quad (3)$$

Where $r(u)$ is a zero-mean unit variance Gaussian, and $F_\phi^u \in \mathcal{X} \mapsto \mathcal{Z}$ is an encoder function parameterized by $\Phi$ for input $x \in X$ specified in addition to noise u. In the case of the designated encoder of Equation 3, the first term of Equation 2 may be simplified according to Non-Patent Document 3 and may be expressed as following Equation 4.

[Equation 4]

$$= \int \frac{*}{2}\|x - G_\theta(F_\phi^u(x))\|^2 r(u)du \quad (4)$$

Where $G_\theta: \mathcal{Z} \mapsto \mathcal{X}$ is a decoder function parameterized by $\theta$.

Therefore, Equation 2 is actually the sum of the distances in ambient and latent space. In particular, the first term represents distance $l_2$ of X, while the second term is a KL divergent term representing the statistical distance of Z. Equation 3 may be further simplified as the following equation.

$$D_{KL}(q_\phi(z|x)\|p(z)) = \int \log\left(\frac{r(u)}{p(F_\phi^u(x))}\right)r(u)du - \int \log\left|\det\left(\frac{\partial F_\phi^u(x)}{\partial u}\right)\right|r(u)du$$

In addition, the VAE selects an encoder function of the following form, which is called a reparametrization trick.

[Equation 5]

$$F_\phi^u(x) = F_\phi(\sigma u + x) \quad (5)$$

Where $\sigma$ is a noise standard deviation. Then, the normalizing flow may further apply $F_\phi$ as an invertible function.

[Equation 6]

$$G_\theta = F_\phi^{-1}. \quad (6)$$

A very interesting phenomenon occurs due to the reversibility condition of Equation 6. More specifically, the surrounding spatial distance of Equation 4 may be simplified as follows.

[Equation 7]

$$\frac{1}{2}\int \|x - G_\theta(F_\phi^u(x))\|^2 r(u)du =$$
$$\frac{1}{2}\int \|x - G_\theta(F_\phi(\sigma u + x))\|^2 r(u)du = \frac{1}{2}\int \|\sigma u\|^2 r(u)du = \frac{\sigma^2}{2} \quad (7)$$

It becomes a constant. Therefore, the decoder part is no longer needed for parameter estimation, and the simultaneous distance minimization problem of the normalizing flow (NF) becomes a single distance minimization problem.

Therefore, the ELBO loss of Equation 2 may be replaced by the following.

[Equation 8]

$$\ell_{flow}(x, \phi) := -\int \log(p(F_\phi^u(x)))r(u)du - \int \log\left|\det\left(\frac{\partial F_\phi^u(x)}{\partial u}\right)\right| r(u)du \quad (8)$$

Where the term $\int \log r(u)r(u)du$ is a constant and thus removed. Equation 8 may be further simplified as follows when a zero mean unit dispersion Gaussian measurement for the latent space Z is additionally assumed.

[Equation 9]

$$\ell_{flow}(x, \phi) = \frac{1}{2}\int \|F_\phi(\sigma u + x)\|^2 r(u)du - \int \log\left|\det\left(\frac{\partial F_\phi(\sigma u + x)}{\partial u}\right)\right| r(u)du \quad (9)$$

This is the final loss function of the normalizing flow (NF).

Now, the main technical difficulty of minimizing the loss function in Equation 9 occurs from the last term related to the computation of complex determinants for large matrices. In addition to the invertible network architecture that satisfies Equation 6, the normalizing flow focuses on the encoder function $F_\phi$ including the following transform sequence.

[Equation 10]

$$F_\phi(u) = (h_K \cdot h_{K-1} \cdot \ldots \cdot h_1)(u) \quad (10)$$

For the encoder function, a change in the variable formula follows.

[Equation 11]

$$\log\left|\det\left(\frac{\partial F_\phi(u)}{\partial u}\right)\right| = \sum_{i=1}^{K} \log\left|\det\left(\frac{\partial h_i}{\partial h_{i-1}}\right)\right| \quad (11)$$

Where $h_0 = u$. The complicated matrix calculation of Equation 9 may be replaced with a relatively easy calculation for each step (Non-Patent Document 2).

The cycle-free CycleGAN according to an embodiment is derived below.

Figure 5:
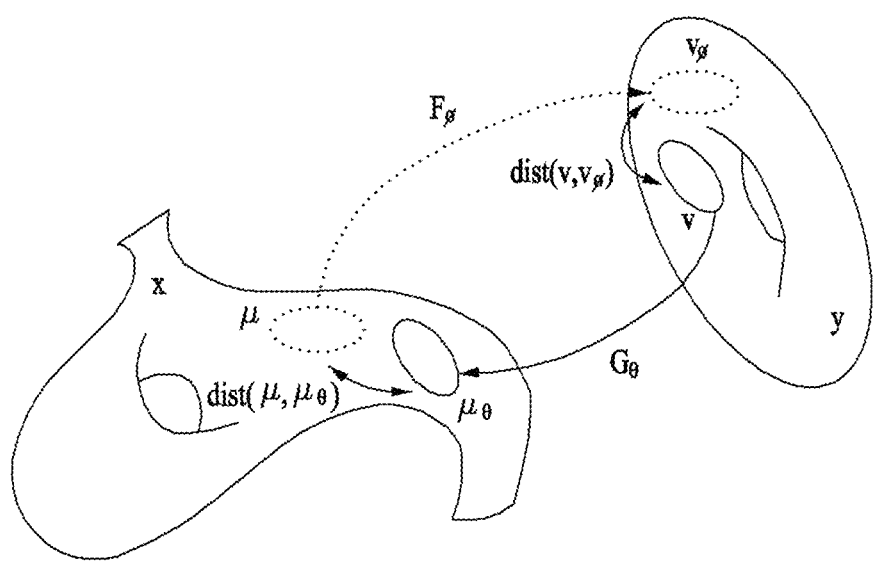
FIG. 5 is a diagram illustrating the analysis of conventional optimal transmission-based CycleGAN learning.

FIG. 5 is a diagram illustrating the analysis of conventional optimal transmission-based CycleGAN learning.

As shown in FIG. 5, it may be understood that CycleGAN learning includes a G generator and a discriminator transmitted from the Y distribution to the X distribution, and an F generator and discriminator transmitted from the X distribution to the Y distribution.

Similar to the normalization flow that considers the transformation between the latent space Z and the surrounding space X for image generation, the main goal of CycleGAN is the image transfer between two spaces, such as X and Y.

In particular, in the case of low-dose CT noise removal, the probability measurement $\mu$ is applied to the target SDCT image space X, while the probability measurement $\nu$ is applied to the LDCT image space Y. Then, the goal of CycleGAN is to transfer the LDCT distribution to the SDCT distribution $\mu$ so that the LDCT distribution follows the SDCT distribution. It is understood that this is closely related to the optimal transmission.

In particular, because the transmission from (X, $\mu$) to (Y, $\nu$) is performed by the forward operator $F_\phi$, $F_\phi$ pushes the measurement $\mu$ of X forward into $\nu_\phi$ of space Y. Meanwhile, the large-scale transfer from one measurement space (Y, $\nu$) to another measurement space (X, $\mu$) are performed by the generator $G_\theta: \mathcal{Y} \to \mathcal{X}$. That is, the generator $G_\theta$ pushes the measurement $\nu$ of Y into the measurement $\mu_\theta$ in the target space X. Then, it is possible to achieve an optimal transmission map for unsupervised learning by simultaneously minimizing the statistical distance dist($\mu$, $\mu_\theta$) between $\mu$ and $\mu_\theta$ and dist($\nu$, $\nu_\phi$) between $\nu$ and $\nu_\phi$.

In contrast to the original VAE and normalizing flow (NF) which use the distance 12 and the divergence KL as the distances in the surrounding and latent spaces, respectively, the embodiment uses Wasserstein measurements as statistical distances inspired by previous studies. Then, simultaneous statistical distance minimization may be achieved by solving the following Kantorovich optimal transmission problem.

[Equation 12]

$$\inf_{\pi \in \Pi(\mu,\nu)} \int_{X \times Y} c(x, y; G_\theta, F_\phi) d\pi(x, y) \quad (12)$$

Where $\Pi(\mu,\nu)$ is a set of common distributions defining the transmission cost together with the margins $\mu$ and $\nu$.

[Equation 13]

$$c(x, y; G_\theta, F_\phi) = \|x - G_\theta(y)\| + \frac{1}{\beta}\|F_\phi(x) - y\| \quad (13)$$

Where $\beta>0$ represents some weighting parameters. In particular, the function of $\beta$ in Equation 13 was studied in the context of $\beta$-CycleGAN.

Additional normalization is often used in many inverse problems. For example, following Non-Patent Document 4 may be used.

[Equation 14]

$$c(x, y; G_\theta F_\phi) = \|x - G_\theta(y)\| + \frac{1}{\beta}\|F_\phi(x) - y\| + \eta\|y - G_\theta(y)\| \quad (14)$$

Where $\eta>0$ is a normalization parameter and the last term makes the variance by the generator disadvantageous. The first two terms in Equation 14 are calculated using both x and y, but the last term is calculated only for y. In terms of the optimal transfer, this makes a great difference. This is because the first term requires a double formula, while the calculation of the last term is negligible.

Actually, the transmission cost Equation 14 in the original formula Equation 12 of unsupervised learning may be expressed as follows.

[Equation 15]

$$\min_{\theta,\phi}\max_{\psi,\varphi} \ell(G_\theta, F_\phi; \psi, \varphi) \quad (15)$$

Where $l(G_\theta, F_\phi; \psi, \varphi)$ $:= \lambda l_{cycle}(G_\theta, F_\phi) + l_{GAN}(G_\theta, F_\phi; \psi, \varphi) + \eta l_y(G_\theta)$ Where $\lambda>0$ is a hyper-parameter, and the cycle consistency is given as follows.

[Equation 16]

$$\ell_{cycle}(G_\theta, F_\phi) = \int_x \|x - G_\theta(F_\phi(x))\|d\mu(x) + \frac{1}{\beta}\int_y \|y - F_\phi(G_\theta(y))\|dv(y) \quad (16)$$

[Equation 17]

$$\ell_{GAN}(G_\theta, F_\phi; \psi, \varphi) = \max_{\varphi \in L^2(x)} \int_x \varphi(x)d\mu(x) - \int_y \varphi(G_\theta(y))dv(y) + \max_{\psi \in L^{\frac{1}{\beta}}(y)} \int_y \psi(y)dv(y) - \int_x \psi(F_\phi(x))d\mu(x) \quad (17)$$

Where $L^\kappa(D)$ denotes space $\kappa$-Lipschitz in domain D.

[Equation 18]

$$l_y(G_\theta) = \int \|y - G_\theta(y)\|dv(y) \quad (18)$$

Similar to the main simplification operation Equation 7 of the normalizing flow (NF), it is very interest to use the invertible generator of Equation 6 for CycleGAN learning. The following suggestion is a key result according to an embodiment.

Proposition 1: Assume that the generator is invertible. That is, $G_\theta = F_\phi^{-1}$ and $F_\phi$ is the $\kappa$-Lipchitz function. Then, the CycleGAN problem of Equation 15 for the transmission cost given by Equation 14 with $\beta=k$ may be expressed as follows.

[Equation 19]

$$\min_\theta \max_\varphi \ell(G_\theta; \varphi) \quad (19)$$

Where

[Equation 20]

$$l(G_\theta;\varphi) := 2l_{GAN}(G_\theta;\varphi) + \eta l_y(G_\theta) \quad (20)$$

Where $l_y(G_\theta)$ is defined in Equation 18.

$$\ell_{GAN}(G_\theta; \varphi) = \max_{\varphi \in L^1(x)} \int_x \varphi(x)d\mu(x) - \int_y \varphi(G_\theta(y))dv(y)$$

Proof: First, because the reversibility condition of Equation 6 means $F_\phi(G_\theta(y))=y$ and $G_\theta(F_\phi(x))=x$, it may be easily understood that $l_{cycle}(G_\theta,F_\phi)$ in Equation 16 disappears. Second, the following equation may be obtained due to the reversibility condition of Equation 6.

[Equation 21]

$$\max_{\psi \in L^{\frac{1}{\psi}}(y)} \int_y \psi(y)dv(y) - \int_x \psi(F_\phi(x))d\mu(x) = \quad (21)$$

$$\max_{\psi \in L^{\frac{1}{\beta}}(y)} \int_x \psi(F_\phi(G_\theta(y)))dv(y) - \int_x \psi(F_\phi(x))d\mu(x) =$$

$$\max_{\varphi'_\phi \in \Phi} \int_y \varphi'_\phi(G_\theta(y))dv(y) - \int_x \varphi'_\phi(x)d\mu(x) =$$

$$\max_{\varphi_\phi \in \Phi} \int_x \varphi_\phi(x)d\mu(x) - \int_y \varphi_\phi(G_\theta(y))dv(y)$$

Where the setting $\Phi$ is defined as follows.

[Equation 22]

$$\Phi = \left\{\varphi \mid \varphi = \psi \circ F_\phi, \psi \in L^{\frac{1}{\beta}}(y)\right\} \quad (22)$$

The last equation comes out as $-\varphi_\phi \in \Phi$ in case of $\varphi=-\varphi'$ and $\varphi_\phi \in \Phi$. Furthermore, because F is $\kappa$-Lipschitz function, the following equation may be obtained.

$$\|\varphi_\phi(x) - \varphi_\phi(x')\| = \|\psi(F_\phi(x)) - \psi(F_\phi(x'))\|$$

$$\stackrel{(a)}{\leq} \frac{1}{\beta}\|F_\phi(x) - F_\phi(x')\|$$

$$\stackrel{(b)}{\leq} \frac{\kappa}{\beta}\|x - x'\| = \|x - x'\|$$

Where inequality (a) is obtained in $1/\beta$-Lipschitz condition of $\psi$, and (b) $F_\phi$ is obtained from a $\kappa$-Lipchitz function, where $\kappa=\beta$ is obtained by the assumption. Therefore, the $\varphi_\phi$ is a 1-Lipschitz function. Therefore, the upper bound may be obtained when extending the function space from $\Phi$ to all 1-Lipschitz functions.

[Equation 23]

$$\max_{\varphi_\phi \in \Phi} \int_x \varphi_\phi(x) d\mu(x) - \int_y \varphi_\phi(G_\theta(y)) dv(y) \leq \qquad (23)$$

$$\max_{\varphi \in L^1(X)} \int_x \varphi(x) d\mu(x) - \int_y \varphi(G_\theta(y)) dv(y)$$

Next, it will be shown that the upper bound of Equation 23 is tight. It is assumed that the φ* is the maximum for Equation 23. The existence of such y must be shown to show that the boundary is robust.

$$\varphi^*(x) = \psi(F_\phi(x)), \forall x \in X$$

Due to the reversibility condition of Equation 6, it is always possible to find y∈Y where x=G_θ(y) for all x∈X.

$$\psi(y) = \psi(F_\phi(G_\theta(y))) = \varphi^*(G_\theta(y)),$$

Therefore, the upper bound is achieved. So the following may be obtained.

$$\max_{\psi \in L^{\frac{1}{\beta}}(y)} \int_y \psi(y) dv(y) - \int_x \psi(F_\phi(x)) d\mu(x) =$$

$$\max_{\varphi \in L^1(X)} \int_x \varphi(x) d\mu(x) - \int_y \varphi(G_\theta(y)) dv(y)$$

Where $1_{GAN}(G,F;\psi,\varphi) = 2 1_{GAN}(G;\varphi)$. This completes the proof.

Compared to normalizing flow (NF), the cycle-free CycleGAN offers several advantages. First, because the latent space Z of the normalized flow (NF) is generally assumed to be a Gaussian distribution, the main focus is on image generation from the noise in the latent space Z to the surrounding space X. In order to apply the normalizing flow (NF) to the image conversion between Y-X domains, it is required to implement the normalization flow (NF) network for converting from Y to Z and the normalization flow (NF) network for converting from Z to X. During the image conversion through the latent space, an empirical result according to an embodiment shows that there is information loss due to the limitation on the Gaussian latent variable. Meanwhile, in the cycle-free CycleGAN, spaces X and Y may be empirical distributions.

Figure 6:
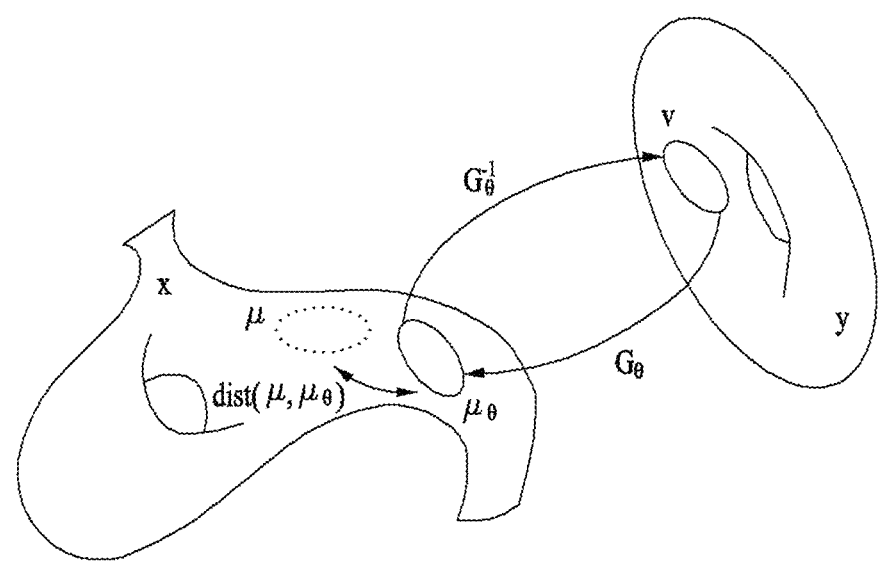
FIG. 6 is a diagram illustrating an interpretation of learning of cycleGAN learning technology using an optimal transmission-based invertible generator according to an embodiment.

FIG. 6 is a diagram illustrating an interpretation of learning of cycleGAN learning technology using an optimal transmission-based invertible generator according to an embodiment.

Referring to FIG. 6, when only the G generator and the discriminator transmitted from the Y distribution to the X distribution by using the invertible generator are trained, the transmitting function from the X distribution to the Y distribution is performed by reverse of the G generator. The most important structure for the invertible generator to learn the image distribution on the invertible operation is a coupling layer. This will be described in more detail below.

In addition, it is very interesting to geometrically interpret the method according to an embodiment. By replacing the forward operator $F_\phi$ with the inverse of the invertible generator $G_\theta^{-1}$, the simultaneous statistical distance minimization problem in the original CycleGAN of FIG. 3 may be replaced with a single statistical distance minimization problem as shown in FIG. 4. Because this phenomenon is similar to the original normalizing flow (NF), it may be assumed that the framework according to an embodiment is an extension of the normalizing flow (NF) in terms of optimal transmission.

Invertible Generator

Various architectures have been proposed to construct an invertible neural network for a flow-based generation model. For example, nonlinear independent component estimation (NICE) (Non-Patent Document 2) is based on a combinable coupling layer leading to volume-preserving invertible mapping. Thereafter, this method is further extended to the affine combining layer to increase the expressiveness of a model.

However, this architecture imposes some constraints on the function the network may represent. For example, only volume preservation mapping may be shown. Subsequent work addressed these limitations by introducing a new invertible transformation. More specifically, a combining layer using real-value non-volume preservation (Real NVP) transformation has been proposed. On the other hand, Kingma et al. (Non-Patent Document 5) proposes an invertible 1×1 transformation as a generalization of permutation operations, thereby greatly improving the image generation quality of a flow-based generation model.

Hereinafter, specific components of an invertible block used in a method according to an embodiment will be described.

Figure 7:
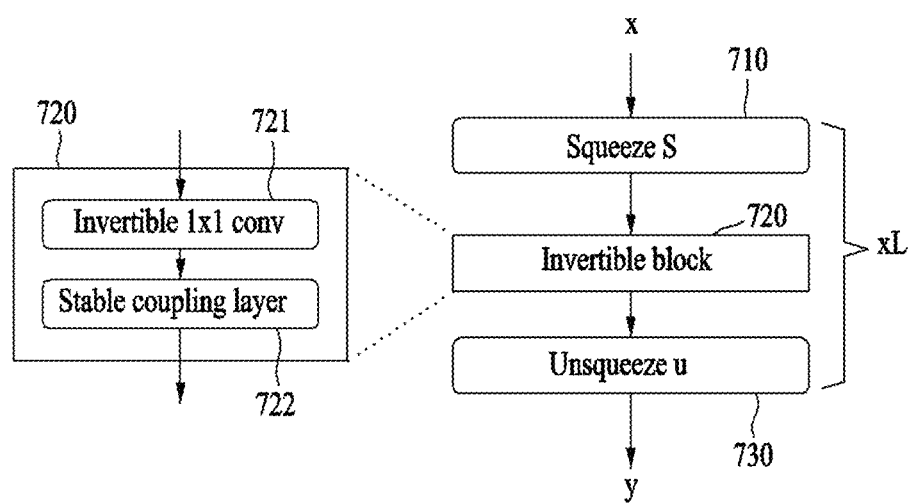
FIG. 7 is a diagram illustrating an architecture of an invertible block and an invertible generator according to an embodiment.

FIG. 7 is a diagram illustrating the architecture of an invertible block and an invertible generator according to an embodiment.

Referring to FIG. 7, the architecture includes L iterations of squeeze/unsqueeze blocks interleaved with an invertible 1×1 convolution and a stable addition combinable coupling layer. In this case, due to reversibility, the operation of obtaining input x from output y may be reversely performed. The detailed description is as follows.

Figure 8:
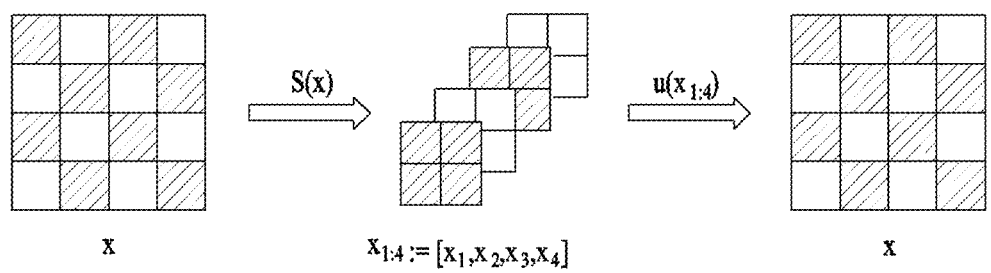
FIG. 8 is a diagram illustrating a squeeze operation and an unsqueeze operation according to an embodiment.

FIG. 8 is a diagram illustrating a squeeze operation and an unsqueeze operation according to an embodiment.

1) Squeeze and unsqueeze operation: The squeeze operation S may divide the input image x into four sub-images arranged in the channel direction as shown in FIG. 8, and may be mathematically expressed as follows.

$$x_{1:1} := [x_1, x_2, x_3, x_4] = S(x)$$

The squeeze operation is essential to build the coupling layer, which will soon become apparent. The unsqueeze operation U is expressed as follows.

$$x = U(x_{1:4}),$$

Then, the separated channels are rearranged into one image through the inverse of the squeeze operation. This operation is applied using the output of the coupling layer so that the unsqueeze output maintains the same spatial dimensions of the input image x.

2) Invertible 1×1 Convolution: The squeeze operation divides the input into four components according to the channel dimensions. As a result, only spatial information limited to a fixed channel arrangement passes through the neural network. Accordingly, it has been proposed to randomly mix and invert the channel dimensions (Non-Patent Document 2) and orders. Meanwhile, the generation flow using the invertible 1×1 convolution (Glow) proposed the invertible 1×1 convolution with the same number of input and output channels as a generalization of permutation operation using learnable parameters (Non-Patent Document 5).

Mathematically, the 1×1 convolution C may be expressed by multiplying the matrix W∈R4×4 as follows.

[Equation 24]

$$C(x_{1:4}) = x_{1:4}W \quad (24)$$

Figure 9:
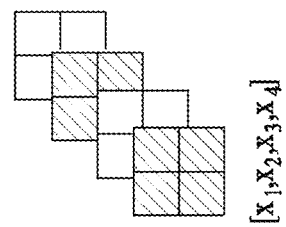
FIG. 9 is a diagram illustrating an invertible 1×1 convolution and vice versa according to an embodiment.
Figure 9:
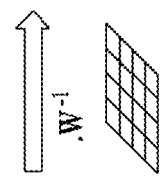
Figure 9:
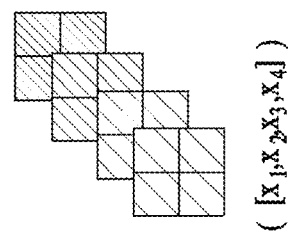
Figure 9:
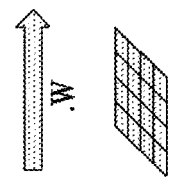
Figure 9:
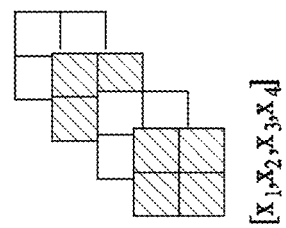

This is shown in FIG. 9. FIG. 9 is a diagram illustrating an invertible 1×1 convolution and vice versa according to an embodiment.

By multiplying the fully filled matrix, it is possible to more efficiently apply subsequent operations by mixing input information classified for each channel together. Then, when 'W' is invertible, the inverse operation $C^{-1}$ may be expressed as follows (Non-Patent Document 5).

[Equation 25]

$$C^{-1}(y_{1:4}) = y_{1:4}W^{-1} \quad (25)$$

3) Stable Bondable Coupling Layer: The coupling layer is an essential component that provides the expressiveness of a neural network while providing reversibility. The combinable coupling layer of NICE (Non-Patent Document 2) is based on even decomposition and odd decomposition of a sequence, and then, neural networks are applied alternately.

The input image is divided into 4 channel blocks and further extended with a general coupling layer to which a neural network is applied at every step. The separated inputs may be processed more efficiently by applying a general invertible transform.

In particular, the stable coupling layer is given by the following equation.

[Equation 26]

$$y_1 = x_1 + F_1([x_2, x_3, x_4])$$
$$y_2 = x_2 + F_2([y_1, x_3, x_4])$$
$$y_3 = x_3 + F_3([y_1, y_2, x_4])$$
$$y_4 = x_4 + F_4([y_1, y_2, y_3]) \quad (26)$$

Where $F_i(\cdot)$, i=1, ..., 4 is a neural network. Then, the block inversion may be easily performed.

[Equation 27]

$$x_4 = y_4 - F_4([y_1, y_2, y_3])$$
$$x_3 = y_3 - F_3([y_1, y_2, x_4])$$
$$z_2 = y_2 - F_2([y_1, x_3, x_4])$$
$$x_1 = y_1 - F_1([x_2, x_3, x_4]) \quad (27)$$

Figure 10:
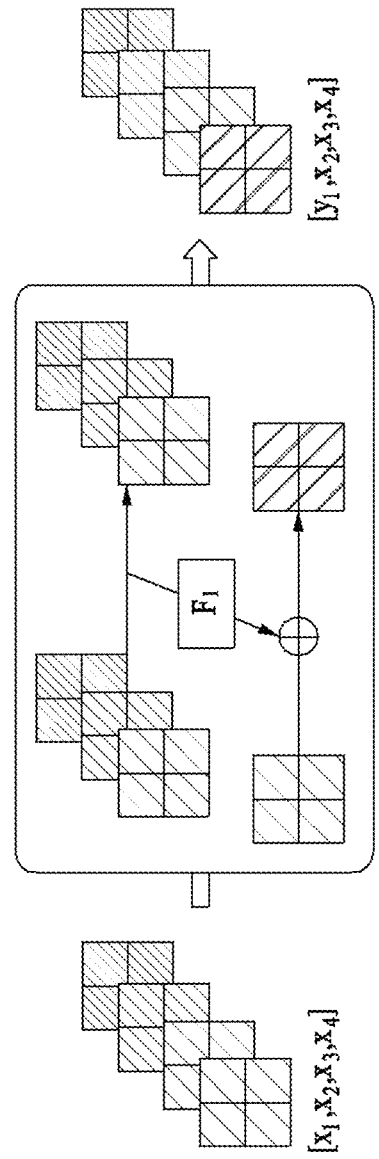
FIG. 10 is a diagram illustrating a method of forward calculation of a coupling layer handling an image according to an embodiment.
Figure 11:
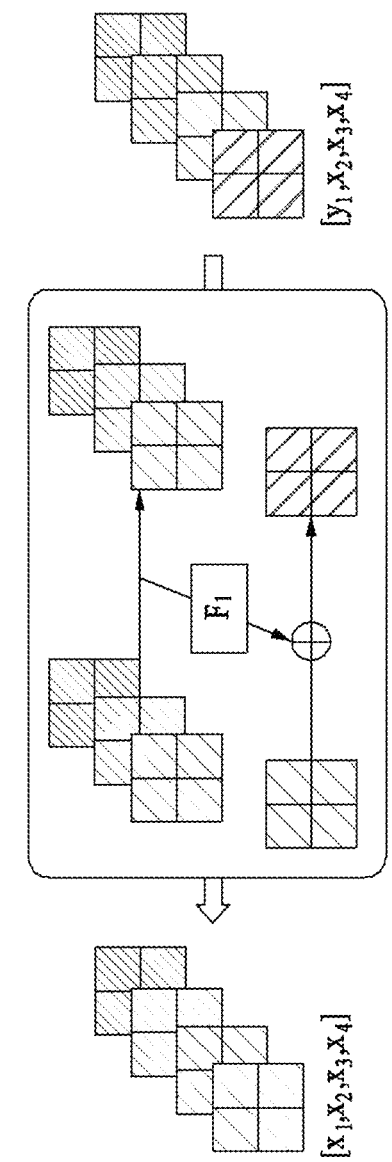
FIG. 11 is a diagram illustrating a method of inverse calculation of a coupling layer handling an image according to an embodiment.

For example, the addition operation $y_1 = x_1 + F_1([x_2, x_3, x_4])$ and the inverse operation $z_1 = y_1 - F_1([x_2, x_3, x_4])$ are the same as in FIGS. 10 and 11.

FIG. 10 is a diagram illustrating a method of forward calculation of a coupling layer handling an image according to an embodiment. FIG. 11 is a diagram illustrating a method of inverse calculation of a coupling layer handling an image according to an embodiment.

Referring to FIG. 10, a method of a single addition operation, that is, a forward operation of a coupling layer handling an image according to an embodiment is illustrated. First, the image is divided into four divided independent images. By the forward operation of the coupling layer, the three divided images pass through the neural network and the results are added to the remaining one image. In this case, the three divided images are maintained as they are.

Referring to FIG. 11, a method of inverse operation of a single addition operation, that is, an inverse operation of a coupling layer handling an image, according to an embodiment is illustrated. This represents a coupling layer that performs backward operation of the forward operation result of FIG. 10 again. The inverse operation of the coupling layer takes the same images from the positions of the three divided images, passes the images through the same neural network, and subtracts the result from the remaining one image. Because the same result is obtained from the same image and the same neural network, the process of adding and subtracting the same result occurs in the end, and by using the coupling layer with these characteristics, it is possible to provide the invertible generator to learn the image distribution on the invertible operation.

4) Lipschitz Constant Calculation: It may be easily understood that Jacobian of the stable coupling layer has a unit determining factor (Non-Patent Document 2). In fact, among the modules of the invertible network described above, only the module without a unit determinant is a 1×1 convolutional layer. In particular, the log determinant of operation of Equation 24 is determined by the log determinant of W (Non-Patent Document 5).

[Equation 28]

$$\log\left|\det\left(\frac{dC(x_{1:4})}{dx_{1:4}}\right)\right| = \log|\det(W)| \quad (28)$$

Similarly, the Lipschitz constant of the invertible generator can be easily confirmed by the matrix norm of W.

Wavelet Residual Learning

Unlike image generation due to noise, one of the important observations in image denoising is that low-noise and clean images share structural similarity. Therefore, in Non-Patent Document 1, a wavelet residual domain learning approach was proposed instead of learning all components of an image, and the embodiments follow the same procedure.

Figure 12:
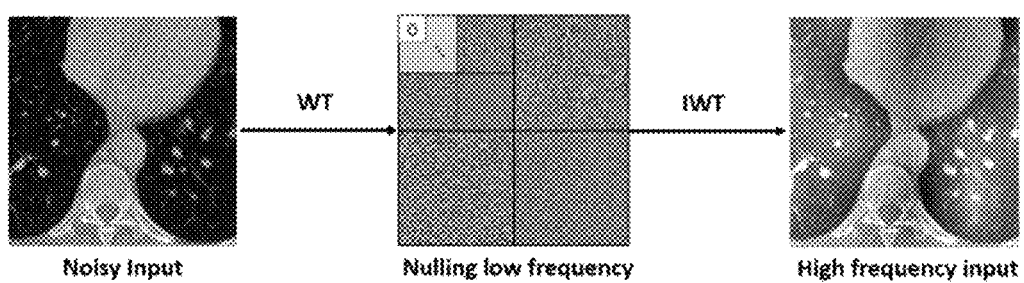
FIG. 12 is a diagram illustrating a method of generating a wavelet residual image according to an embodiment.
Figure 13:
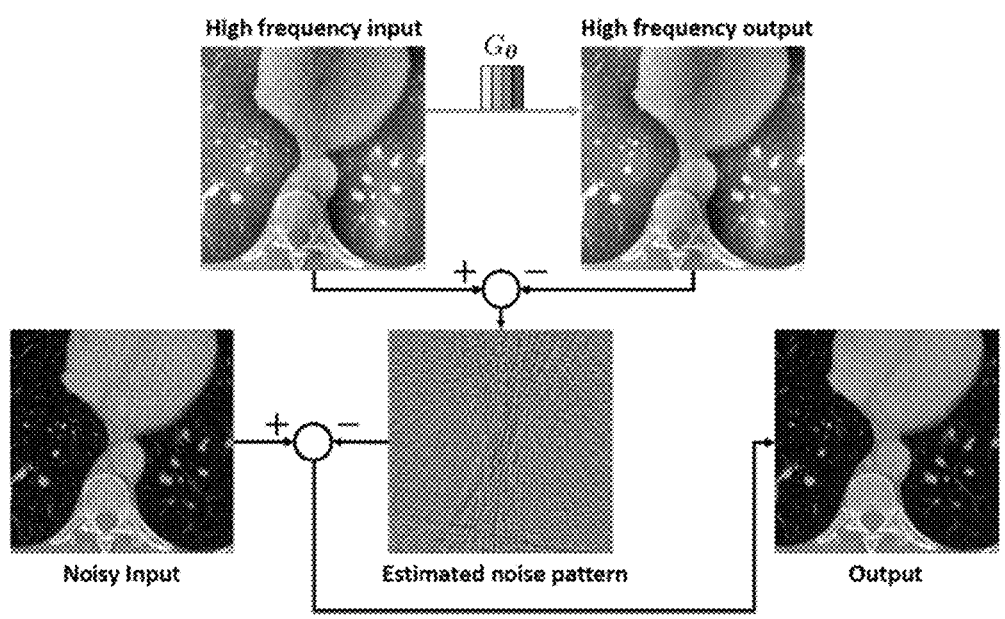
FIG. 13 is a diagram illustrating a network trained using a wavelet residual image according to an embodiment.

FIG. 12 is a diagram illustrating a method of generating a wavelet residual image according to an embodiment. FIG. 13 is a diagram illustrating a network trained using a wavelet residual image according to an embodiment.

As shown in FIG. 12, wavelet decomposition separates a high-frequency component and a low-frequency component, and then invalidates only the low-frequency (LL) component in the last level decomposition to obtain a wavelet residual image including the high-frequency component. That is, the wavelet residual image is generated by invalidating the lowest band of the wavelet decomposition.

Then, as shown in FIG. 13, the network according to an embodiment is trained using only high-frequency components. Accordingly, this makes it much easier to handle the CT noise component in the network because most of the CT noise is concentrated in the high frequencies and typical low-pass images are not processed by the neural network. A network according to an embodiment is trained using wavelet residuals, and after obtaining a noise pattern, a final image may be obtained by subtracting the noise pattern.

Hereinafter, an implementation method according to an embodiment will be described.

To verify the noise removal performance of the framework, two datasets of quantitative analysis and qualitative analysis are used. Paired low-dose and standard-dose CT image datasets are used for quantitative analysis. In particular, the data are abdominal CT projection data of the AAPM 2016 low-dose CT grand challenge. For qualitative experiments, an unpaired 20% dose cardiac polyphase CT scan dataset is used. The details will be described below.

1) AAPM CT Data Set: The AAPM CT dataset is a CT image dataset reconstructed from abdominal CT projection data of the AAPM 2016 low-dose CT grand challenge. With the approval of the institutional review committee of the Mayo clinic, a total of 10 patient data were obtained. A 512×512 CT image was reconstructed using a conventional filtered posterior projection algorithm. Poisson noise was inserted into the projection data to create a degree of noise corresponding to 25% of the normal dose. Because the low-dose CT image data is simulated based on the normal-dose CT image, the low-dose CT image data is a paired dataset. In case of such learning, all values of the dataset are converted in Hounsfield units [HU] and a value less than −1000 HU are truncated to −1000 HU. Then, the dataset is divided by 4000 to normalize all data values between [−1,1]. The 3839 CT images are used to learn the network, and the network is tested by using the remaining 421 images.

2) 20% Dose Polyphase Cardiac CT Scan Dataset: A 20% dose multiphase cardiac CT scan dataset was obtained from 50 CT scans of patients with mitral value deviation and 50 CT scans of patients with coronary artery disease. The dataset was collected at Ulsan University College of Medicine and used for research by Gu (Non-Patent Document 1). Electrocardiogram (ECG) gated cardiac CT scans using a second-generation dual-source CT scanner were performed. In the case of low-dose CT scans, the tube current is reduced to 20% of that of normal-dose CT scans. In the case of learning, all values of the dataset are converted to Hounsfield units [HU] and values less than −1024 HU are truncated to −1024 HU. Then, the dataset is divided by 4096 to normalize all data values between [−1,1]. The 4684 CT images are used to learn the network, and use the remaining 772 images are used to test the model.

As shown in FIG. 7, the invertible generator is constructed based on the flow of the invertible generator with L=4. To extract wavelet residuals, daub3 wavelets are used and the wavelet decomposition level is set to 6 for all datasets.

Figure 14:
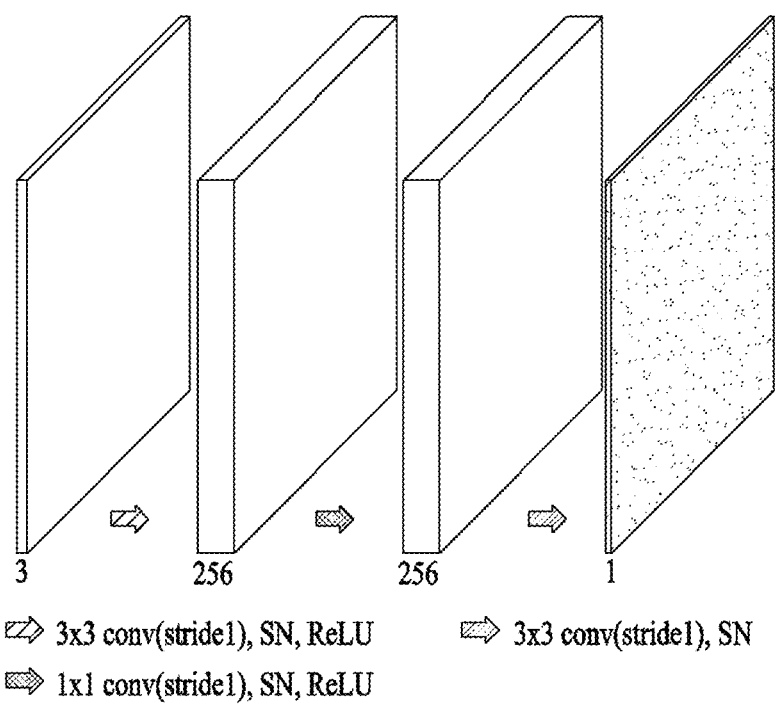
FIG. 14 is a diagram illustrating the architecture of a neural network in a coupling layer according to an embodiment.

FIG. 14 is a diagram illustrating the architecture of a neural network in a coupling layer according to an embodiment. Basically, the architecture includes three convolutional layers having spectral normalization followed by multi-channel input single-channel channel output convolution. The first and last convolutional layers use a 3×3 kernel with a stride of 1, and the second convolution layer uses a 1×1 kernel with a stride of 1. In addition, the potential feature map channel size is 256. At each step, zero padding is applied to the first and last convolutional layers so that the height and width of the feature map are the same as the previous feature map.

Figure 15:
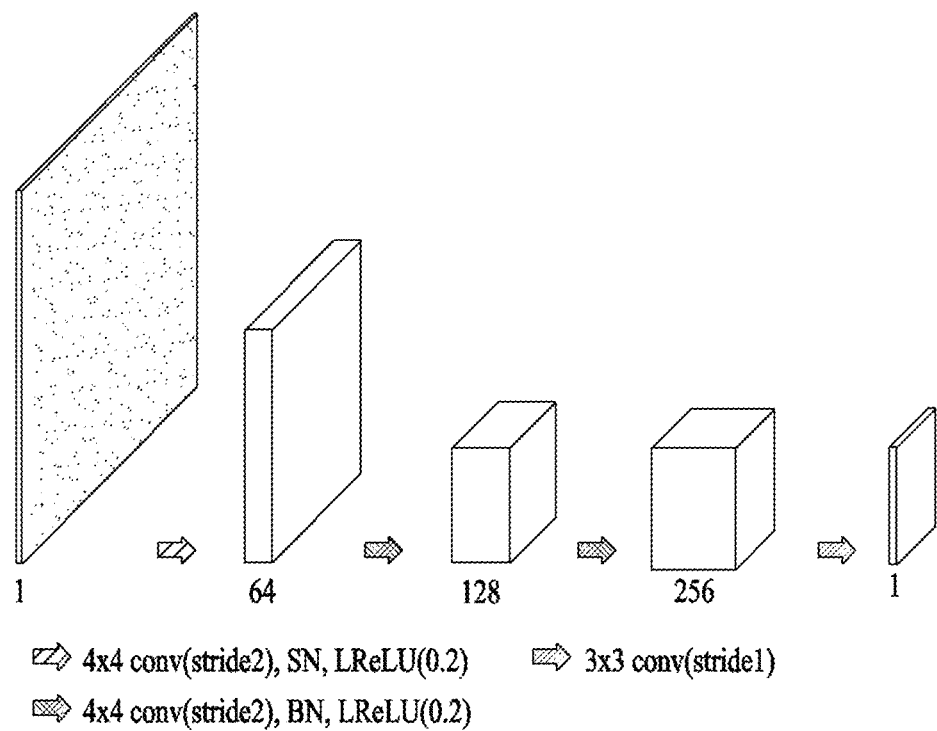
FIG. 15 is a diagram illustrating the architecture of a PatchGAN discriminator according to an embodiment.

FIG. 15 is a diagram illustrating the architecture of a PatchGAN discriminator according to an embodiment.

The discriminator is formed based on the PatchGAN architecture. The overall structure of the discriminator is shown in FIG. 15, which is based on the PatchGAN discriminator including 4 discriminator layers rather than 5 discriminator layers. The first two convolutional layers use a stride of 2, and the remaining convolutional layers use a stride of 1. No batch normalization is applied after the first and last convolutional layers. After batch normalization, excluding the last convolutional layer, LeakyReLU with a gradient of 0.2 is applied. In the first convolutional layer without batch normalization, LeakyReLU was applied after the convolutional layer. Discriminator loss is calculated as LSGAN loss.

For all datasets, the network is $\beta_1=0.9$, $\beta_2=0.999$, $\epsilon=1\times 10^{-8}$ and trained with $\eta=10$ for $f_Y(G_\theta)$ at 18 by utilizing the ADAM optimizer with a mini-batch size of 1. The learning rate was initialized to $1\times 10^{-4}$ and halved after every 50,000 iterations. The network was trained 150,000 iterations on an NVIDIA GeForce RTX 2080 Ti. In addition, the code according to an embodiment was implemented with Pytorch v1.6.0 and CUDA 10.1.

For quantitative experimental analysis, a peak signal-to-noise ratio (PSNR) and a structure similarity index metric (SSIM) are used. The PSNR is defined as follows.

[Equation 29]

$$PSNR(x, y) = 20\log_{10}\frac{MAX_x}{\|x-y\|_2}, \quad (29)$$

Where x is the input image, y is the target image, and MAXx is the maximum possible pixel value of the image x.
The SSIM is defined as follows.

[Equation 30]

$$SSIM(x, y) = \frac{(2\mu_x\mu_y + c_1)(2\sigma_{x,y} + c_2)}{(\mu_x^2 + \mu_y^2 + c_1)(\sigma_x^2 + \sigma_y^2 + c_2)}, \quad (30)$$

Where $\mu$ is the image mean, $\sigma$ is the variance of the image, and $c_1=(k_1L)^2$, $c_2=(k_2L)^2$, $k_1=0.01$, $k_2=0.03$.

A method according to an embodiment was compared with an existing unsupervised LDCT noise removal network (Non-Patent Document 1). For the AAPM dataset, the network performance was compared with the existing CycleGAN based on U-net architecture. In this case, the method was also compared with the AdaIN-based switchable CycleGAN (Non-Patent Document 1). This shows cutting edge performance for LDCT noise removal. For the unpaired 20% dose CT scan dataset, the method is compared with the AdaIN-based switchable CycleGAN.

In the learning of the existing CycleGAN, the image is cut into 128×128 patches, the learning rate is initialized to $1\times 10^{-3}$, is trained for 200 epochs, and other learning settings are set to be the same as the proposed network learning. In the AdaIN-based switchable CycleGAN, the same patch size was used, the learning rate was initialized to $2\times 10^{-4}$ which is a network trained for 200 epochs, and the other learning settings were the same as the proposed network learning. Both comparison methods used PatchGAN including 5 convolutional layers for the discriminator architecture.

Figure 16:
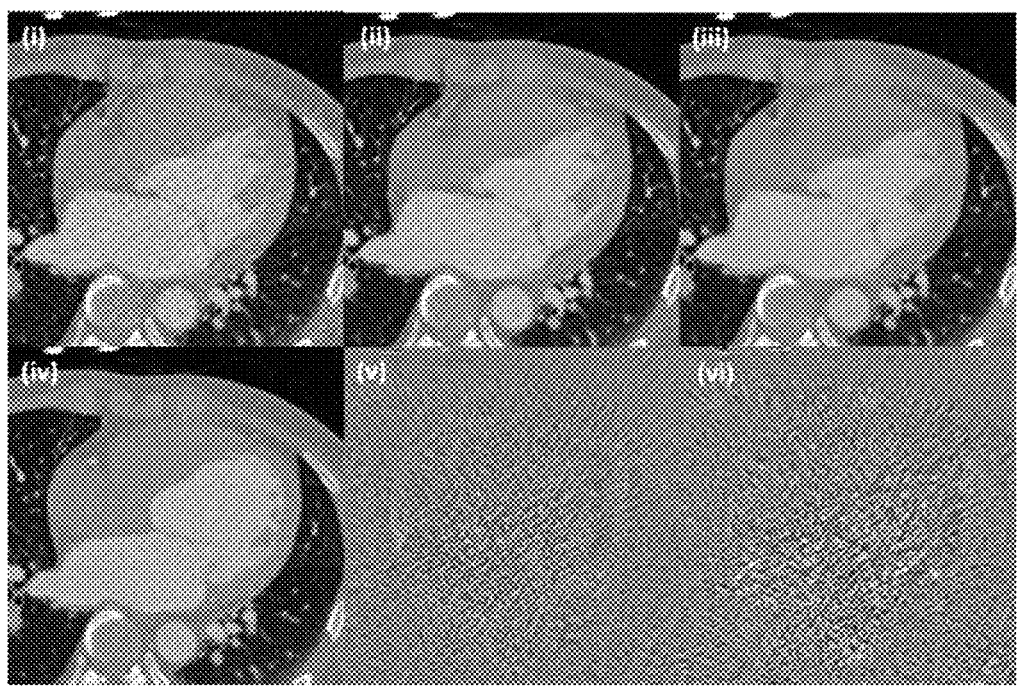
FIG. 16 is a diagram illustrating the noise removal result of a low-dose computed tomography image of a conventional recurrent generative adversarial neural network and the proposed method.

FIG. 16 is a diagram illustrating the noise removal result of a low-dose computed tomography image of a conventional recurrent generative adversarial neural network and the proposed method. Referring to FIG. 16, (i) shows a low-dose image, (ii) shows an existing result, (iii) shows a result of the proposed method, (iv) shows a normal-dose image, (v) shows the difference between (i) and (ii), and (vi) shows the difference between (i) and (iii).

Figure 17:
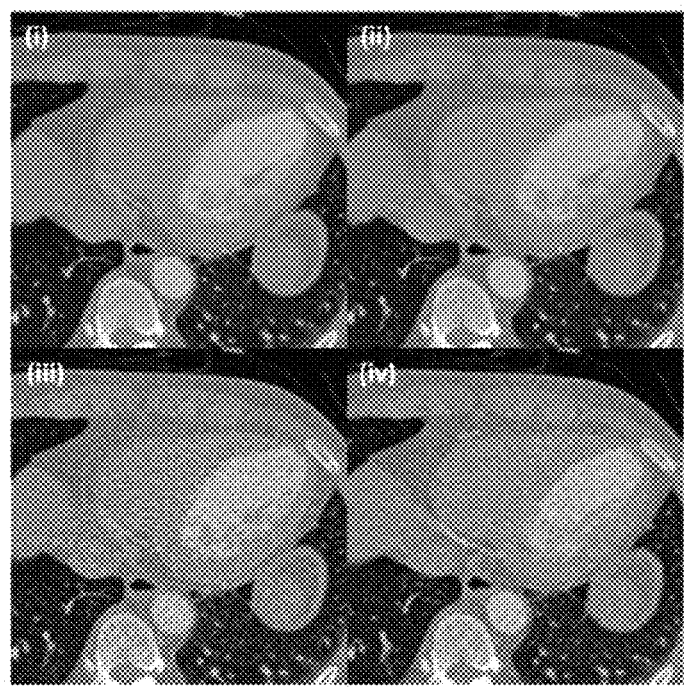
FIG. 17 is a diagram illustrating a result of confirming whether an invertible generator performs an appropriate reverse operation according to an embodiment.

FIG. 17 is a diagram illustrating a result of confirming whether an invertible generator performs an appropriate reverse operation according to an embodiment. Referring to FIG. 17, (i) shows a normal dose image, (ii) shows an existing result, (iii) shows a reverse operation result of the proposed invertible generator, and (iv) shows a low dose image.

In order to compare the noise removal performance of a low-dose computed tomography image of an efficient cyclic generative adversarial neural network using the proposed invertible generator, conventional cyclic generative adversarial neural network learning techniques trained under the same condition shown in FIG. 16 are compared and listed. As shown in FIG. 17, it may be confirmed that a cleaner image than the existing cyclic generative adversarial neural network learning technique is provided, and the reverse operation result of the invertible generator creates an image with noise added to the clean image again.

Figure 18:
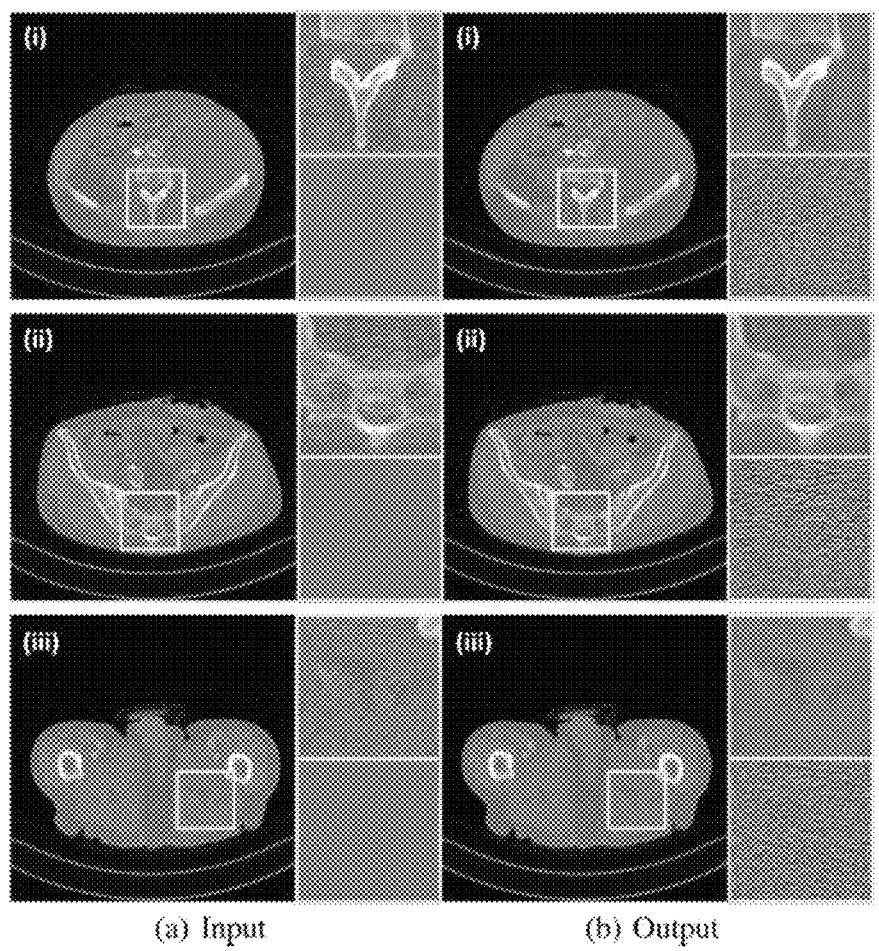
FIG. 18 is a diagram illustrating a noise removal result according to an embodiment.

FIG. 18 is a diagram illustrating a noise removal result according to an embodiment.

Referring to FIG. 18, the left (low-dose photographing image) and right (result of noise removal by the proposed method) images for different images (i-iii) are listed and shown. Therefore, it shows the advantage of being able to remove various noises as the same effective noise removal is performed in the noise removal of other upper tomography images.

By using a total of two neural networks of a light invertible generator neural network and a discriminator neural network that produce the above-described performance, as shown in Table 1, it has the advantage of using only 1/10 of the number of learnable parameters used for noise removal of conventional low-dose computed tomography images based on a cyclic generative adversarial neural network. Through such an efficient operation, the power used for the operation may be dramatically reduced.

Table 1 shows the number of learnable parameters used in the conventional cyclic generative adversarial neural network (left), the latest cyclic generative adversarial neural network-based noise removal technique (middle), and the proposed noise removal technique (right).

TABLE 1

| Conventional CycleGAN | | AdaIN CycleGAN [6] | | Proposed | |
|---|---|---|---|---|---|
| Network | # of Parameters | Network | # of Parameters | Network | # of Parameters |
| $G_\theta$ | 6,251,392 | $G_\theta$ | 5,900,865 | $G_\theta$ | 1,204,320 |
| $F_\phi$ | 6,251,392 | F | 274,560 | — | — |
| $D_x$ | 2,766,209 | $D_x$ | 2,766,209 | $D_x$ | 662,401 |
| $D_y$ | 2,766,209 | $D_y$ | 2,766,209 | — | — |
| Total | 18,035,202 | Total | 11,707,843 | Total | 1,866,721 |

As described above, according to embodiments, improved image quality is provided compared to the existing neural network-based low-dose X-ray computed tomography image restoration technique. In addition, by dramatically reducing the amount of computation required for learning the neural network, the size of the neural network is reduced to a level that is easy to store and manage even on mobile media including smartphones, so that various applications are possible.

The embodiments may be applied to low-dose X-ray computed tomography image restoration with reduced radiation dose, and may be applied to various computed tomography techniques. In addition, according to embodiments, it is possible to apply to various CycleGAN-based technologies by opening the possibility of omitting the neural network by applying an invertible generator even in a technology using the existing CycleGAN.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter.

According to embodiments, by providing the invertible generator and applying the invertible generator to CycleGAN, it is possible to learn even with unmatched data and perform unsupervised learning only with two neural networks, thereby effectively improving the image quality of a low-dose computed tomography reconstructed image and using the number of learnable parameters by 1/10 (one tenth) than that of the related art.

According to the embodiments, the size of the neural network is reduced to a level that is easy to store and manage even in removable media, including smart phones, by remarkably reducing the amount of computation required.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Thus, it is intended that the inventive concept covers other realizations and other embodiments of this invention provided they come within the scope of the appended claims and their equivalents.

What is claimed is:

1. A method of processing a low-dose X-ray computed tomography image based on unsupervised learning by using an invertible neural network performed by a computer device, the method comprising:
   providing an invertible generator for restoring an image; and
   training the invertible generator with a single discriminator to restore a low-dose computed tomography image to a normal computed tomography image.

2. The method of claim 1, further comprising:
   improving a quality of the low-dose X-ray computed tomography image based on the unsupervised learning by using a single generator neural network and a single separator neural network by providing the invertible generator.

3. The method of claim 1, wherein the providing of the invertible generator includes:
   providing an invertible block including a coupling layer.

4. The method of claim 3, further comprising:
   allowing the invertible generator to learn a distribution of an image in an invertible operation through the coupling layer.

5. The method of claim 1, wherein the providing of the invertible generator includes:
   performing a squeeze operation and an unsqueeze operation on an input image; and
   performing an invertible operation through an invertible block between the squeeze operation and the unsqueeze operation.

6. The method of claim 5, wherein the invertible block includes a coupling layer coupled to an invertible 1×1 convolution stably and additionally.

7. The method of claim 1, wherein the training of the invertible generator includes:
   simultaneously performing, by reverse of the invertible generator, a function of reversely returning the normal computed tomography image to the low-dose computed tomography image when the invertible generator is trained to restore the low-dose computed tomography image to the normal computed tomography image.

8. The method of claim 1, wherein the training of the invertible generator includes:
   allowing the invertible generator to learn using a wavelet residual image and obtain a final image by excluding a noise pattern after obtaining the noise pattern.

9. An apparatus for processing a low-dose X-ray computed tomography image based on unsupervised learning by using an invertible neural network, the apparatus comprising:
   an invertible generator providing unit configured to provide an invertible generator for restoring an image; and
   a learning device configured to train the invertible generator with a single discriminator to restore from a low-dose computed tomography image to a normal computed tomography image.

10. The apparatus of claim 9, wherein a quality of the low-dose X-ray computed tomography image based on the unsupervised learning is improved by using a single generator neural network and a single separator neural network by providing the invertible generator.

11. The apparatus of claim 9, wherein the invertible generator providing unit provides an invertible block including a coupling layer.

12. The apparatus of claim 11, wherein the invertible generator learns a distribution of an image in an invertible operation through the coupling layer.

13. The apparatus of claim 9, wherein the invertible generator providing unit performs a squeeze operation and an unsqueeze operation on an input image; and performs an invertible operation through an invertible block between the squeeze operation and the unsqueeze operation.

14. The apparatus of claim 13, wherein the invertible block includes a coupling layer capable of being coupled to an invertible 1×1 convolution stably and additionally.

15. The apparatus of claim 9, wherein the learning device simultaneously performs a function of reversely returning the normal computed tomography image to the low-dose computed tomography image by reverse of the invertible generator when the invertible generator is trained to restore the low-dose computed tomography image to the normal computed tomography image.

16. The apparatus of claim 9, wherein the learning device allows the invertible generator to learn using a wavelet residual image and obtain a final image by excluding a noise pattern after obtaining the noise pattern.

17. An invertible neural network that is used in an apparatus for processing a low-dose X-ray computed tomography image based on unsupervised learning, the invertible neural network comprising:
   an invertible block including a coupling layer for restoring an image with a single discriminator,
   wherein the invertible neural network performs a squeeze operation and an unsqueeze operation on an input image and performs an invertible operation through an invertible block between the squeeze operation and the unsqueeze operation.

18. The invertible neural network of claim 17, wherein the invertible block includes the coupling layer capable of being coupled to an invertible 1×1 convolution stably and additionally.

19. The invertible neural network of claim 17, wherein invertible generator simultaneously performs, by reverse of the invertible generator, a function of reversely returning a normal computed tomography image to a low-dose computed tomography image when the invertible generator is trained to restore the low-dose computed tomography image to the normal computed tomography image.

20. The invertible neural network of claim 17, wherein the invertible generator learns using a wavelet residual image and obtain a final image by excluding a noise pattern after obtaining the noise pattern.

\* \* \* \* \*